United States Patent [19]
Goede

[11] Patent Number: 5,246,375
[45] Date of Patent: Sep. 21, 1993

[54] MEMORY AIDING DEVICE

[76] Inventor: Wouter Goede, Rembrandtlaan 20, Heemstede, Netherlands

[21] Appl. No.: 764,007

[22] Filed: Nov. 15, 1991

[51] Int. Cl.⁵ .............................. G09B 19/00
[52] U.S. Cl. ........................ 434/236; 33/1 SD; 283/73; 283/74; 283/98; 283/904
[58] Field of Search ............ 434/108, 109, 222, 236, 434/238, 306, 368, 430, 408; 283/73, 74, 904, 98; 33/1 SB, 1 SD, 1 CF, 562; 273/148 R, 269, 265, 240

[56] References Cited

U.S. PATENT DOCUMENTS

| | | | |
|---|---|---|---|
| 2,290,226 | 7/1942 | Bechtold | 273/240 |
| 3,224,116 | 12/1965 | De Pue | 434/354 |
| 3,254,893 | 6/1966 | Serviere | 273/240 |
| 3,642,191 | 2/1972 | Roof | 434/408 X |
| 4,059,275 | 11/1977 | Price | 273/265 |
| 4,194,742 | 3/1980 | Adams | 273/265 |
| 4,689,018 | 8/1987 | Trinity | 283/904 X |
| 4,885,459 | 12/1989 | Norsworthy | 283/73 X |
| 4,957,298 | 9/1990 | Silverman | 283/73 X |
| 4,998,355 | 3/1991 | Greene | 33/562 X |
| 5,085,587 | 2/1992 | Des Forges et al. | 434/353 X |

Primary Examiner—Paul J. Hirsch
Assistant Examiner—L. Thomas
Attorney, Agent, or Firm—John J. Daniels

[57] ABSTRACT

A memory aiding device for aiding in remembering a predetermined personal identification number. A substrate has sequence representing integers predisposed on it in rows and columns for representing a personal identification number. Each respective sequence representing integer is printed at a respective column and row intersection. A user definable location is designated at an intersection of a row and a column and designates a set of sequence representing integers. A set of marks is recorded on a sheet member. Each mark indicates a respective numeral of the personal identification number represented by a corresponding sequence representing integer. When the recorded sheet member is disposed under the substrate at the user defined location, the personal identification number represented by the corresponding sequence representing integers is perceived by perceiving the marks.

19 Claims, 8 Drawing Sheets

|   | A | B | C | D | E | F | G | H | I | J | K | L | M | N | O | P | Q | R | S |
|---|---|---|---|---|---|---|---|---|---|---|---|---|---|---|---|---|---|---|---|
| 1 | 1 | 6 | 0 | 4 | 3 | 8 | 5 | 0 | 7 | 2 | 9 | 4 | 1 | 2 | 1 | 3 | 5 | 6 | 3 4 2 7 4 9 2 7 0 4 1 3 6 1 2 3 4 5 |
| 2 | 2 | 7 | 8 | 5 | 4 | 9 | 6 | 1 | 8 | 3 | 0 | 5 | 3 | 4 | 2 | 4 | 4 | 7 | 5 6 3 8 5 0 3 8 9 5 2 4 7 2 7 5 6 7 3 2 |
| 3 | 3 | 8 | 1 | 6 | 5 | 0 | 7 | 2 | 9 | 4 | 1 | 6 | 5 | 6 | 5 | 7 | 3 | 8 | 7 8 4 9 6 1 4 9 1 6 5 7 8 3 6 7 8 9 5 4 |
| 4 | 4 | 8 | 2 | 7 | 8 | 1 | 8 | 3 | 0 | 5 | 2 | 7 | 7 | 8 | 6 | 8 | 2 | 9 | 9 0 5 0 7 2 5 0 2 7 6 8 9 4 8 9 0 1 7 6 |
| 5 | 5 | 0 | 3 | 8 | 7 | 2 | 9 | 4 | 1 | 6 | 3 | 8 | 9 | 0 | 9 | 0 | 1 | 0 | 1 2 6 1 8 3 6 1 3 8 9 0 0 5 0 1 2 3 9 8 |
| 6 | 1 | 6 | 0 | 4 | 3 | 8 | 5 | 0 | 7 | 2 | 9 | 4 | 1 | 2 | 1 | 3 | 5 | 6 | 3 4 2 7 4 9 2 7 0 4 1 3 6 1 2 3 4 5 |
| 7 | 2 | 7 | 8 | 5 | 4 | 9 | 6 | 1 | 8 | 3 | 0 | 5 | 3 | 4 | 2 | 4 | 4 | 7 | 5 6 3 8 5 0 3 8 9 5 2 4 7 2 7 5 6 7 3 2 |
| 8 | 3 | 8 | 1 | 6 | 5 | 0 | 7 | 2 | 9 | 4 | 1 | 6 | 5 | 6 | 5 | 7 | 3 | 8 | 7 8 4 9 6 1 4 9 1 6 5 7 8 3 6 7 8 9 5 4 |
| 9 | 4 | 8 | 2 | 7 | 8 | 1 | 8 | 3 | 0 | 5 | 2 | 7 | 7 | 8 | 6 | 8 | 2 | 9 | 9 0 5 0 7 2 5 0 2 7 6 8 9 4 8 9 0 1 7 6 |
| 0 | 5 | 0 | 3 | 8 | 7 | 2 | 9 | 4 | 1 | 6 | 3 | 8 | 9 | 0 | 9 | 0 | 1 | 0 | 1 2 6 1 8 3 6 1 3 8 9 0 0 5 0 1 2 3 9 8 |

MEMORY AIDING DEVICE

BACKGROUND OF THE INVENTION

This invention relates to a memory aiding device for aiding in remembering, for example, a personal identification number used in conjunction with a bank card or credit card. In today's modern world, an individual is often required to remember a multitude of sequences. For example, an individual may have to remember a personal identification number for his bank card, his telephone card, and a host of credit cards. Often, the individual does not use each of these identification numbers often enough for them to become ingrained in his memory. Therefore, it is common for individuals to write the sequence on, for example, a separate sheet of paper, and store it separately with the bank card, credit card, etc. However, when it comes time to use the personal identification number, the separate sheet of paper with the sequence written on it is often not handy, thus, creating a substantial disadvantage for the individual.

In the instance where the individual chooses to keep the sequences written down in the same location (such as a wallet or purse) as the bank card, credit card, etc. in the event that the wallet or purse is lost or stolen, the individual runs the risk that an unscrupulous individual will obtain his card and easily withdraw cash with the bank card or make charges on the credit card using the written down sequence.

Because of the ever increasing need to remember infrequently used sequences, there is a substantial need for a means to aid in the memorizing, and/or recording of these numbers.

SUMMARY OF THE INVENTION

The present invention is intended to provide a remedy. It is an object of the present invention to provide a memory aiding device for use in remembering sequences.

In accordance with the present invention, a memory aiding device includes a substrate made of plastic, paper or the like. The substrate may be transparent, frosted, colored or opaque and has printed on it location designating means for designating a location. The substrate also has printed on it sequence representing means locatable by the location designating means for representing a predetermined sequence. For example, the predetermined sequence may be a personal identification number, in which case it contains sequence elements selected from the integers 0–9. The inventive memory aiding device further comprises recording means for recording the predetermined sequence which is located by the location designated by the location designating means. The recording means may be comprised of a plastic, paper, or the like, and may be transparent, frosted, colored or opaque.

In accordance with a preferred embodiment of the present invention, the substrate is a frosted transparent plastic and the recording means comprises a paper sheet member which has printed on it a grid system so as to form individual cells. The paper sheet member also has an adhesive backing covered by a protective cover which may be peeled away, so that the recording means can be adhered to, for example, the face of a bank card.

To use the inventive device, the individual places the transparent substrate over the recording means so as to locate the recording means at a location on the substrate that is known only to the user. The location is designated by an imaginary intersection of row and column location designating symbols printed on the transparent substrate. When the inventive device is to be used to remember numbers, a plurality of groups of sequential integers comprising 0–9 are disposed along the rows and columns defined by the location designating means.

In accordance with the present invention, adjacent groups of sequence representing rows (the integers 0–9) are sequenced so as not to have the same sequential order. Therefore, at each location designated by the location designating means a different sequence of integers will be grouped.

DETAILED DESCRIPTION OF THE DRAWINGS

Figure 1:
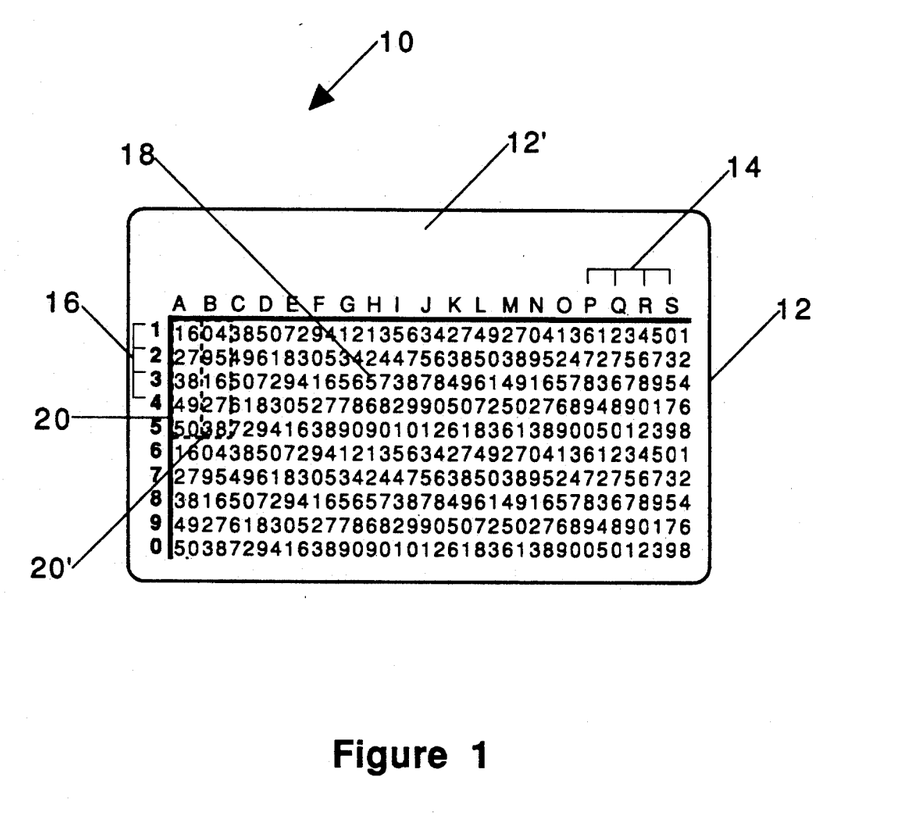
FIG. 1 is a plan view of one embodiment of the substrate of the inventive memory aiding device.

Referring to FIG. 1, an embodiment of the inventive memory aiding device 10 comprises a substrate 12, which may be made from plastic, paper or the like. The substrate may be completely transparent, frosted, colored or opaque. Further, the substrate 12 may be completely transparent or frosted and have a header portion 12' which is opaque to facilitate printing on the front and backsides of the header portion 12', for example, for printing the name and/or logo of a business. Location designating means are disposed on the substrate 12 by printing, etching or the like. In the embodiment shown in FIG. 1, the location designating means comprises first location designating symbols, such as letters 14 disposed on the substrate in a row and second location designating symbols, such as numerals 16 disposed on the substrate 12 in a column. A location 18 (for example H3) is thus designated by the letter H of the first location designating symbols 14 and the numeral 3 of the second location designating symbols Sequence representing means, such as sequence representing numerals, in this case the integers from 0–9, are disposed on the substrate 12 in groups. For example, in this embodiment, the first group is enclosed in dashed-box 20 and a second group is enclosed in dashed-box 20'. In this embodiment, each group, for example, 20 and 20', consists of five consecutive rows and two adjacent columns, comprising the integers 0-9. Each group has a sequence of the integers 0-9 that is different from the sequence of its adjacent groups. Thus, by placing a plurality of groups side-by-side, the sequence representing numerals appear random. Alternatively, the formation of the groups may consist of, for example, one row or column comprising the integers 0-9. Additionally, symbols (such as letters) representing numerals may comprise the sequence representing means.

Figure 2A:
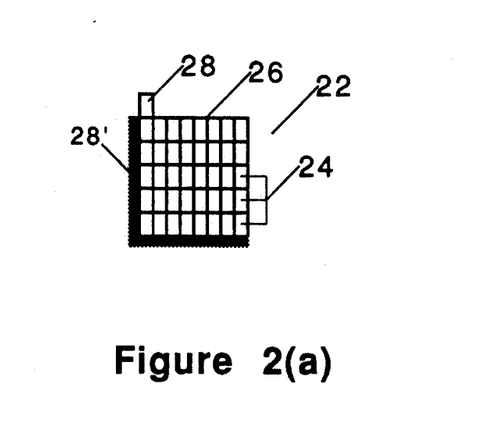
FIG. 2(a) is a plan view of one embodiment of the recording means of the inventive memory aiding device.
Figure 2B:
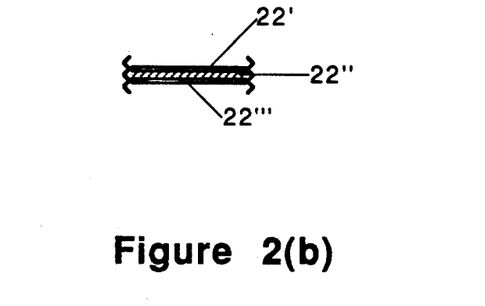
FIG. 2(b) is a schematic cut-away view of the recording means shown in FIG. 2(a)

FIG. 2(a) shows recording means 22 of the inventive memory aiding device 10. In this embodiment, the recording means 22 is made up of individual cells 24 of a grid system 26. The recording means 22 records a predetermined sequence, such as personal identification numbers, credit card numbers and the like. The recording means 22 includes in this embodiment, locating means 28. The recording means 22 in this embodiment may also include location aiding means 28' which helps to align the recording means with the sequence representing means (shown in FIG. 1). FIG. 2(b) is a cut away view showing the layers comprising the recording means 22. In this embodiment the recording means 22 includes a sheet member 22' which may be, for example, paper, which is backed by an adhesive 22''. The adhesive 22'' is protected by a protective backing 22''', which may be peeled away so that the recording means 22 may be adhered to, for example, the face of a credit card.

Figure 3:
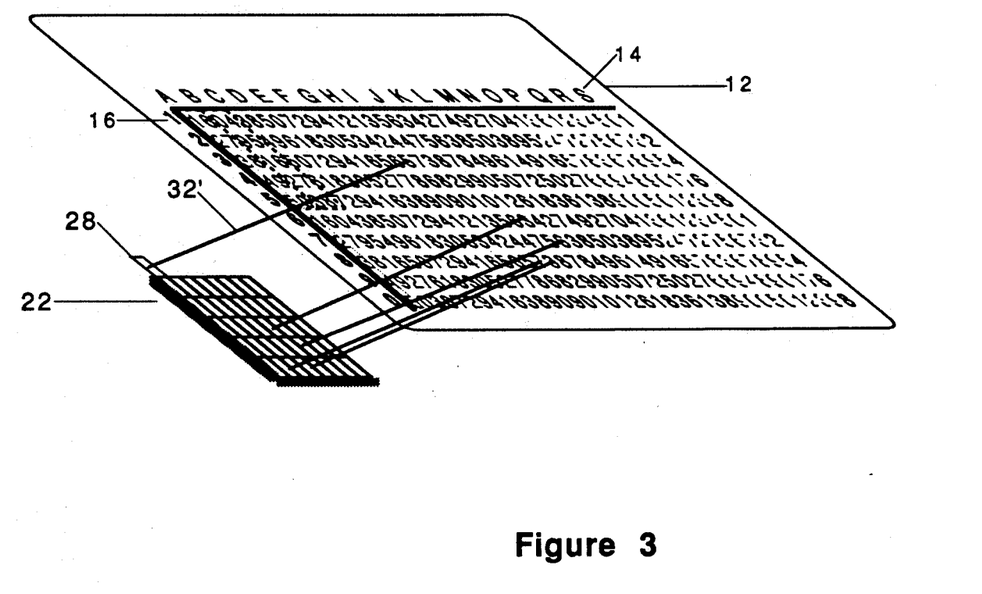
FIG. 3 is a perspective view of the inventive memory aiding device.
Figure 4A:
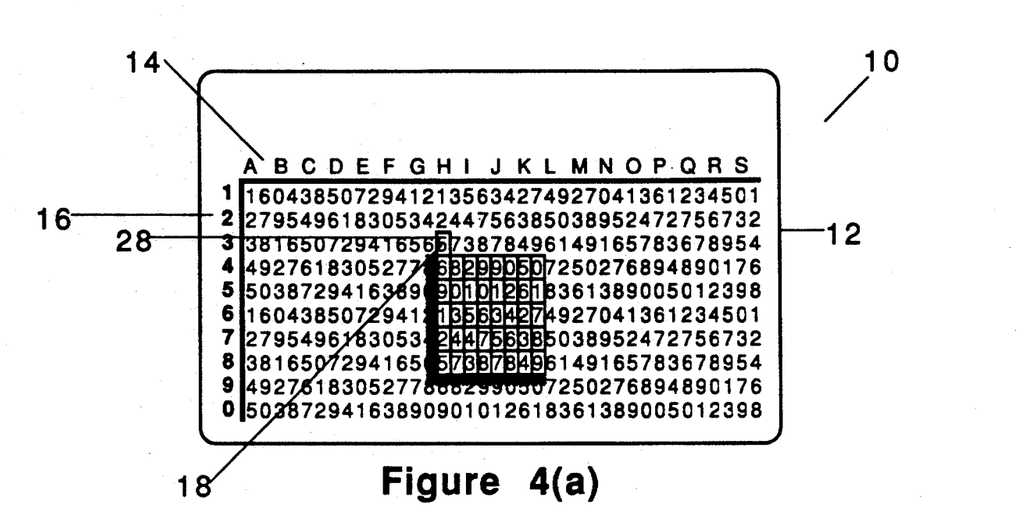
FIG. 4(a) is a plan view of the memory aiding device.

Referring to FIG. 3, an intended use of the first embodiment of the inventive memory aiding device 10 will be described. The transparent substrate 12 has a plurality of first location designating symbols, such as letters 14 disposed in a row. A plurality of second location designating symbols, such as numerals 16, are disposed in a column. The first and second location designating symbols are disposed in relation to each other so that a location 18 may be designated by a combination of at least one of the first location designating symbols, for example the letter H, and at least one of the second location designating symbols, for example the numeral 3. Thus, as shown by a line of sight line 32', the locating means 28 of the recording means 22 is located at location H3 (as shown in FIG. 4). Therefore, the user merely has to memorize location H3 in order to correctly line up the recording means 22 with the substrate 12. Note that an combination of a letter 14 and a numeral 16 may be selected for designating the location to aid in memorizing a particular sequence. In other words, it is possible to select, for example, D7 as the location in which case the user has to only remember the combination D7 and when practicing the inventive device will be able to perceive the predetermined sequence.

Figure 4B:
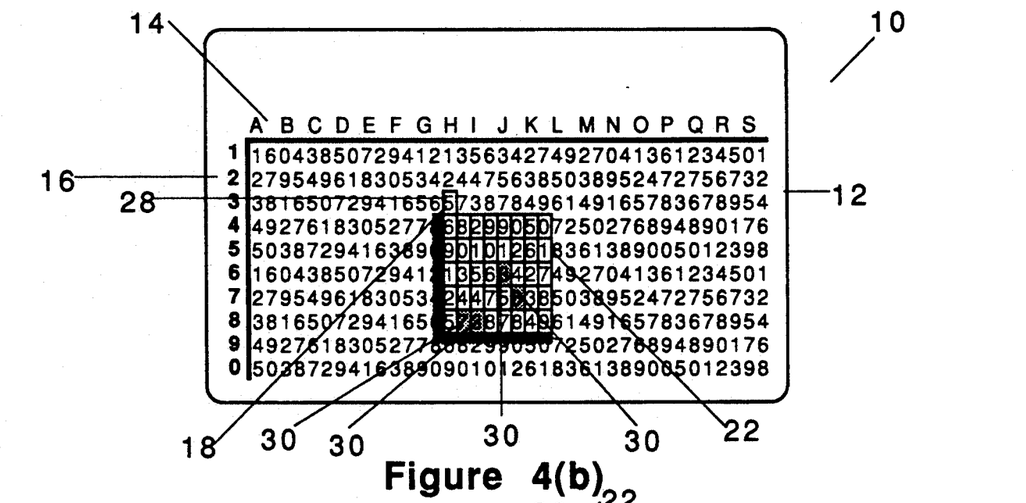
FIG. 4(b) is a plan view of the inventive memory aiding device shown in use.
Figure 4C:
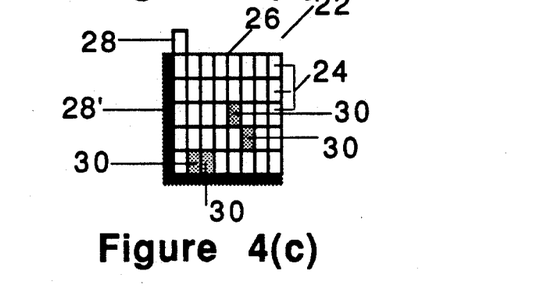
FIG. 4(c) is a plan view of the recording means of the inventive memory aiding device shown in use.
Figure 7:
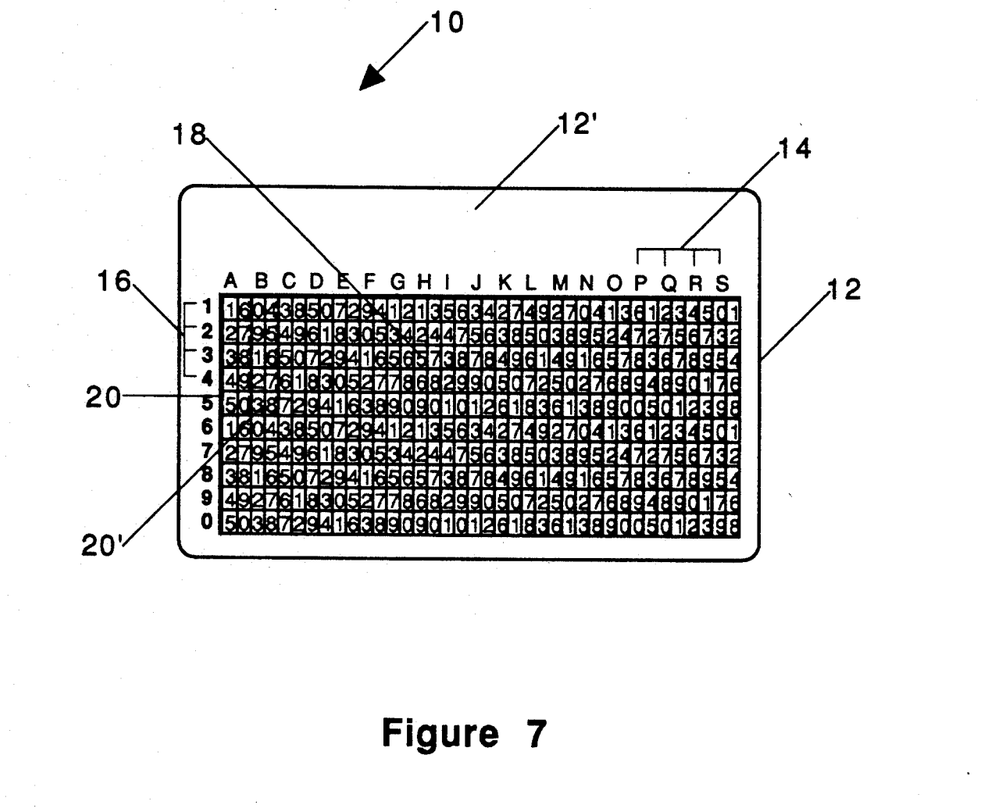
FIG. 7 is a plan view of yet another embodiment of the substrate of the inventive memory aiding device.

Referring to FIGS. 3 and 4(a)-4(c), the recording means 22 is comprised of a paper sheet 22' having an adhesive backing 22''. To record the predetermined sequence the user places the transparent substrate over the memory means 22 so that the grid system 26 of the recording means 22 lines up with the sequence representing means or a grid system 26' disposed on the substrate 12 (shown in FIG. 7). The locating means 28 of the recording means 22 is thus visible through the transparent substrate 12 at a selected location, in this case, H3. Next, the use determines which individual cells 24 of the recording means 22 corresponds with each element of the predetermined sequence. In other words, the user will find each individual cell 24 of the recording means 22 which corresponds with each individual element of the predetermined sequence. Next, the user places a mark 30 at each individual cell which corresponds with one of the predetermined sequence elements. For example, as shown in FIGS. 4(a)-4(c), if the sequence to be memorized is 7336, the user will place a mark 30 in each of the individual cells 24 of the recording mean 22 which corresponds with each of these predetermined sequence elements.

In accordance with the present invention, the user may remove the sheet member 22' from its protective backing 22''' to expose the adhesive 22'' and place the recording means 22 on a corresponding credit card. For example, to remember the personal identification number of a bank machine card, the user would first record the sequence at a chosen location, for example H3, and then record the sequence using the method described above on the recording means 22. He may next place the recording means 22 on his credit card if desired using the adhesive backing. Therefore, when the user wishes to retrieve the sequence, he merely has to remember H3. In other words, by placing the transparent substrate 12 over the recording means 22 so that the locating means 28 is visible at the location H3, the sequence, in this case 7336 will be visible. Therefore, in accordance with this present invention, the user only has to remember a simple letter and numeral combination.

Furthermore, often an individual has numerous sequences to remember, and each may be recorded on separate recording means, and, by using the same location, for example H3, the user only has to remember the combination H3 and can retrieve the sequence by placing the transparent substrate 12 over the appropriate recording means 22 adhered to a corresponding card.

Figure 5:
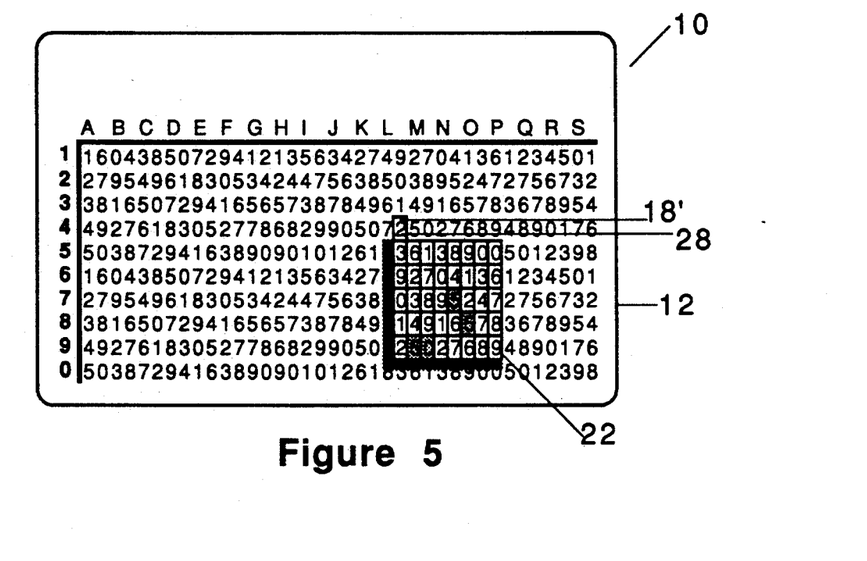
FIG. 5 is a plan view of the inventive memory aiding device showing the recording means at an incorrect location.

As shown in FIG. 5, if the transparent substrate 12 is placed over the recording means 22 so that the locating means 28 is disposed at an incorrect location 18' (in this case M4), the sequence which will be perceived by reading the marks 30 (in this case 5055) will not be the desired sequence originally recorded on the particular recording means 22. Thus, in accordance with the present invention, even if the memory aiding device 10 is lost or stolen, an unscrupulous individual would have to either know the location designation, for example H3, or randomly select from the plurality of possible location designations. In the embodiment shown in the figures, 96 different combinations are possible. Thus, the user can be secure that even if the memory aiding device 10 is lost or stolen it would be very difficult for an unscrupulous individual to determine his predetermined sequence.

Figure 6:
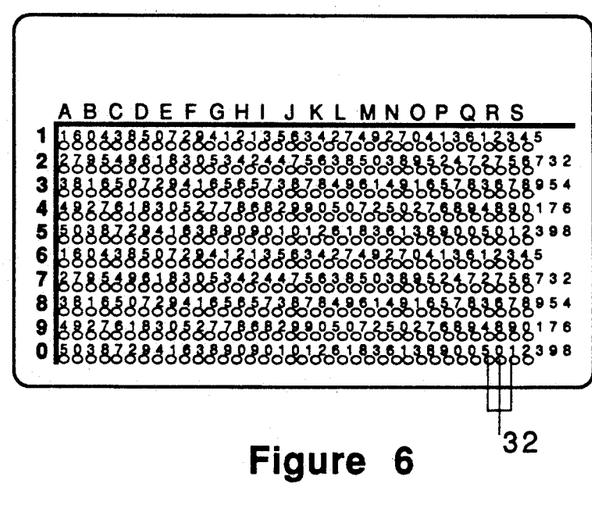
FIG. 6 is a plan view of another embodiment of the substrate of the inventive memory aiding device.

In an alternative embodiment, as shown in FIG. 6, the transparent substrate 12 has a plurality of through holes 32 and each through hole corresponds with one of the sequence representing elements. Therefore, in accordance with this embodiment, in order to record the predetermined sequence the user merely has to insert a marking means, for example a pencil or pen tip into the corresponding through hole 32 of each element of the predetermined sequence.

It is also contemplated that the recording means 22 may be transparent so that it may be placed on top of the substrate 12 so as to facilitate the marking of the marks 30 on the appropriate locations of the transparent recording means 22 at which the sequence representing elements representing the desired sequence are visible.

Referring to FIGS. 1-4, methods for writing and reading a predetermined sequence (such as a personal identification number) using the inventive memory aiding device 10 will be described. The method of writing the predetermined sequence using the memory aiding device 10 comprises the steps of placing the transparent substrate 12 over the recording means 22 so that the locating means 28 is visible through the transparent substrate 12 at a preselected location (for example, H3). Or, alternatively, placing a transparent recording means 22 over the substrate 12. Next, the individual cells 24 of the recording means 22 which are associated with each sequence representing element which sequentially corresponds with a respective sequence element of the predetermined sequence are perceived. Finally, each of the appropriate individual cells 24 are marked, for example, by placing a mark 30 using a pen or a pencil, so as to thereby record the predetermined sequence.

Once the sheet member 22' of the recording means 22 has been marked as described above, it may be read by the following method. First, the transparent substrate 12 is placed over the recording means 22 at the preselected location (for example, H3). Next, the individually marks 30 in the cells 24 of the recording means 22 are perceived through the transparent substrate 12 to thereby read the respective sequence representing element and thus reconstruct the predetermined sequence, in this case 7336.

Figure 8:
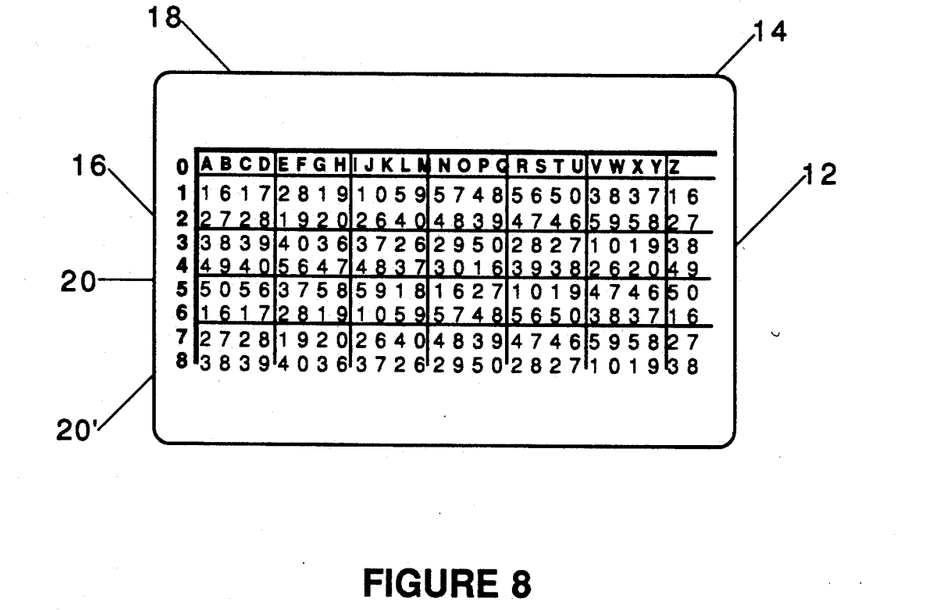
FIG. 8 is a plan view of still another embodiment of the substrate of the inventive memory aiding device.

Referring to FIG. 8, an embodiment of the inventive memory aiding device 10 is shown in which letters 14 are disposed so that each of the columns of numbers is designated by a letter. In this case, every other column has the numerals 1-5 and its adjacent column has the numerals 0-6. By this arrangement, every group of numbers (2 columns×5 rows) will have the digits 0-9, thus, facilitating the use of the invention.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. A memory aiding device for retrieving a predetermined sequence, comprising: a substrate; location designating means disposed on the substrate for designating a plurality of locations; sequence representing means comprising a plurality of groups of sequence representing elements, each group comprising at least one sequence representing element for representing each member of a predetermined set of potential elements, the sequence representing elements being predisposed on the substrate for representing a desired sequence of sequence elements selected from the predetermined set of potential elements; and recording means comprising a markable sheet member having an adhesive backing for recording the desired sequence and locatable by the location to position the sheet member relative to the substrate so that the desired sequence is perceivable.

2. A memory aiding device according to claim 1; wherein the substrate is transparent.

3. A memory aiding device according to claim 1; wherein the location designating means comprises a plurality of first location designating symbols, and a plurality of second location designating symbols disposed in relation to the first location designating symbols so that the location is designated by a combination of at least one of the first location designating symbols and at least one of the second location designating symbols.

4. A memory aiding device according to claim 3; wherein the first location designating symbols are disposed in a row and the second location designating symbols are disposed in a column.

5. A memory aiding device according to claim 1; wherein the predetermined set comprise the integers 0-9.

6. A memory aiding device according to claim 1; wherein the predisposed sequence representing element of each group are predisposed on the substrate in a different sequence then the predisposed sequence representing elements of an adjacent group.

7. A memory aiding device comprising: a transparent substrate, location designating means comprising at least one row of a plurality of first location designating symbols printed on the substrate, and at least one column of a plurality of second location designating symbols printed on the substrate, at least one of the second location designating symbols effective in combination with at least one of the first location designating symbols for designating corresponding locations on the substrate so that a user definable location is designated by one of the first location designating symbols and one of the second location designating symbols, a plurality of groups of sequence representing elements printed on the substrate for representing a predetermined sequence comprising sequence elements selected from a predetermined set of potential elements, and locatable at said corresponding locations by the location designating means; and recording means comprising a sheet member adapted to record marks, each of said marks being addressable by one of said sequence representing elements so as to be readable as one of the sequence elements; whereby the transparent substrate is placable over the sheet member and the marks are perceivable so as to read the predetermined sequence so that the desired sequence is retrievable by disposing the recording means depending on the user definable location.

8. A memory aiding device according to claim 7; wherein the transparent substrate comprises plastic.

9. A memory aiding device according to claim 7; further comprising location aiding means for aiding the determination of said corresponding locations and comprising a grid printed on the substrate.

10. A memory aiding device according to claim 7; wherein the first and second location designating symbols are letters and numerals.

11. A memory aiding device according to claim 7; wherein the predetermined set comprises the integers 0-9.

12. A memory aiding device according to claim 7; wherein the sequence representing elements comprise the integers 0-9.

13. A memory aiding device according to claim 7; wherein the recording means comprises a grid.

14. A memory aiding device according to claim 7, wherein the recording means comprises locating means for locating the recording means at the location.

15. A method of writing a predetermined sequence using the memory aiding device according to claim 7, the method of writing comprising the steps of: placing the transparent substrate over the sheet member at a prescribed location designated by the location designating means; perceiving portions of the recording means directly below each sequence representing element which sequentially corresponds with respective sequence elements of the predetermined sequence; and marking the perceive portions to produce a recorded sheet member.

16. A method of reading the recorded sheet member according to claim 15, the method of reading comprising the steps of: placing the transparent substrate over the recorded sheet member at the preselected location; and perceiving the marked portions of the sheet member to read the predetermined sequence from the respective sequence representing elements directly over the marked portions.

17. A memory aiding device for aiding in remembering a predetermined personal identification number, comprising: a substrate; sequence representing integers predisposed on the substrate in rows and columns for representing a personal identification number, each respective sequence representing integer being printed at a respective column and row intersection; location designating means for designating a plurality of locations, each location being an intersection of a row and a column and designating a set of sequence representing integers; recording means for recording a set of marks, each mark indicating a respective numeral of the personal identification number represented by a corresponding sequence representing integer, the recording means disposable relative to the substrate depending on the location so that the personal identification number represented by the corresponding sequence representing integers is perceivable by perceiving the marks.

18. A memory aiding device for aiding in remembering a predetermined personal identification number according to claim 17, wherein the location designating means comprises first location designating symbols for designating respective columns and second location designating symbols for designating respective rows so that a user definable location is designated by one of the first location designating symbols and one of the second location designating symbols; whereby the personal identification number is retrievable by disposing the recording means depending on the user definable location.

19. A memory aiding device according to claim 17; wherein the recording means is readable through the substrate and comprises a markable sheet member having an adhesive back for adhering the sheet member to a card associated with the personal identification number, the sheet member being adapted to record marks, each mark being addressable by one of the sequence representing integers so as to determine a respective numeral of the personal identification number.

* * * * *